(12) United States Patent
Torrez (10) Patent No.: US 6,610,916 B1
(45) Date of Patent: Aug. 26, 2003

(54) DRUMMER'S SNAKE

(76) Inventor: Michael Torrez, 428 S. Main St., Winter Garden, FL (US) 34787

( * ) Notice: Subject to any disclaimer, the term of this patent is extended or adjusted under 35 U.S.C. 154(b) by 0 days.

(21) Appl. No.: 10/026,512

(22) Filed: Dec. 24, 2001

(51) Int. Cl.[7] .............................................. B10D 13/02
(52) U.S. Cl. ...................................................... 84/421
(58) Field of Search .......................... 84/421, 327, 453

(56) References Cited

U.S. PATENT DOCUMENTS

| | | | |
|---|---|---|---|
| 1,045,583 A | 11/1912 | Mills | |
| 4,212,219 A | * 7/1980 | Hubbard | 84/723 |
| 4,579,229 A | 4/1986 | Porcaro et al. | 211/13 |
| 4,703,506 A | 10/1987 | Sakamoto et al. | 381/92 |
| D305,026 S | 12/1989 | Wolf | D14/229 |
| 4,889,303 A | 12/1989 | Wolf | 248/160 |
| 5,048,789 A | 9/1991 | Eason et al. | 248/544 |
| 5,058,170 A | 10/1991 | Kanamori et al. | 381/92 |
| D327,211 S | 6/1992 | Tarshis et al. | D8/615 |
| 5,149,905 A | * 9/1992 | Count | 84/744 |
| 5,490,599 A | 2/1996 | Tohidi | 211/171 |
| 5,520,292 A | 5/1996 | Lombardi | 211/13 |
| D384,077 S | 9/1997 | Frasse | D14/229 |
| 5,936,176 A | 8/1999 | Lombardi | 84/421 |
| 6,007,032 A | 12/1999 | Kuo | 248/185 |

FOREIGN PATENT DOCUMENTS

JP   2000-102084   * 4/2000

\* cited by examiner

*Primary Examiner*—Shih-Yung Hsieh
(74) *Attorney, Agent, or Firm*—Brian S. Steinberger; Law Offices of Brian S. Steinberger, P.A.

(57) ABSTRACT

A lightweight and easily erectable, collapsible and storable rack system for supporting music components adjacent to associated instruments. The racks can support microphones arranged about a drum set. The rack system includes fittings for horizontal bars that are pivotally attached to one another and foldable legs for the bars that allows for the system to be easily and neatly packed away during nonuse. Microphones can be pivotally attached to extendable arms, which in turn are pivotally attached to the horizontal bars. The arms can extend upward and downward from the bars, and be bendable to allow further versatility. Power and communication cables can also run through the legs and bars to the microphones.

8 Claims, 8 Drawing Sheets

DRUMMER'S SNAKE

This invention relates to instrument racks, and in particular to a foldable, expandable, and an interchangeable assembly for supporting accessories such as microphones and cables to be supported and arranged about instruments such as drum sets, and the like.

BACKGROUND AND PRIOR ART

Generally, many drummers use at least approximately five to approximately twelve microphone stands with boom arms. Also, the drummers need microphone cables that can be at least approximately twenty to approximately thirty feet in length for each microphone. For example, for a snare, hi-hats, three toms, a bass drum and overhead cymbals, up to nine or more individual microphone stands have been used. In addition for each microphone stand there is the requirement for individual microphone cables. For example, nine stands has required nine cables. Additionally, the traditional stands are difficult to pack up and move and further require substantial space for storage. The conventional individual stands and cables do not fold up together. Additionally, the time expense to set up and take down multiple stands and cables is an additional problem. Furthermore, the weight of the stands and cables adds a substantially extra burden for transporting and setting up the equipment.

U.S. Pat. No. Des. 305,026 to Wolf; U.S. Pat. No. 4,889,303 to Wolf; U.S. Pat. No. 5,048,789 to Eason et al.; and U.S. Pat. No. 6,007,032 to Kuo, each show conventional type microphone stands. However, none of the patents allow for multiple microphones, nor provide any wrap around rack, nor support individual cables, and all suffer from all the problems described above.

Some attempts have been made over the years to support multiple microphones. See for example, U.S. Pat. No. 1,045,583 to Mills; U.S. Pat. No. Des. 384,077 to Frasse; and U.S. Pat. No. 5,490,599 to Tohidi. However, these patents are generally limited to single stands for holding up several microphones. The single stand cannot support multiple microphones that must be arranged at various vertical heights and horizontally about an instrument set such as a drum set.

Accessory type rails have also been proposed. See U.S. Pat. No. 4,579,229 to Porcaro et al. and U.S. Pat. No. 5,520,292 to Lombardi. However, these patented devices have rails with limited heights and lengths for directly mounting both the instruments and the microphones directly on the rails; Thus, the drummer is limited to the physical constraints of these rails for which to position both their microphones and their instruments. Both of these patents do not allow the user to customize different height and spatial type locations for their instruments and microphones. Both of these devices do not allow for extension arms with microphones to be added to the rails. Additionally, both of these devices would potentially require multiple outside cables arranged about the rails.

Other patents of interest known to the subject inventor that also fail to overcome the problems described above include U.S. Pat. No. Des. 327,211 to Tarshis et al.; U.S. Pat. No. 4,703,506 to Sakamoto et al. and U.S. Pat. No. 5,058,170 to Kanamori et al.

SUMMARY OF THE INVENTION

The primary objective of the subject invention is to provide a single rack unit for instruments such as drums for supporting accessories such as microphone stands and cables.

The secondary objective of the subject invention is to provide a single rack unit for instruments such as drums, which wraps about the instruments(such as the drum set).

The third objective of the subject invention is to provide a single rack unit for instruments such as drums, which can fold up for easy storage. The invention has extension boom arms that can swing and fold parallel to the main rack unit. The main rack units arms and legs can swing in and fold up so that the entire unit is in a bundle having dimensions of approximately four feet in length, approximately ten inches high, and be approximately ten inches wide.

The fourth objective of the subject invention is to provide a single rack unit for instruments such as drums that is lightweight. All the components of the single rack unit combined together can weigh approximately one fourth the weight of conventional type microphone stands and cables that are being replaced.

A first preferred embodiment can include a rack having up to four or more legs, and up to three or more horizontal support bars that are pivotally attached to one another so that the rack can be easily assembled and disassembled. Fasteners such as thumbscrews can be used to tighten the legs and horizontal bars to desired positions so that the rack can be arranged about an instrument set such as a set of drums. Various novel microphone stands can be attached to the horizontal bars and legs and be further extendable and bendable to selected positions as needed.

A second embodiment allows for the microphones to be easily attached to the rack by simple plug type connections such as but not limited to XLR connectors, and the like.

Further objects and advantages of this invention will be apparent from the following detailed description of a presently preferred embodiment which is illustrated schematically in the accompanying drawings.

BRIEF DESCRIPTION OF THE FIGURES

FIG. 1b is an enlarged view of the sound board connection used in FIG. 1a.

FIG. 1c is an enlarged view of a microphone mounting fitting used in FIG. 1a.

FIG. 1d is an enlarged view of a dual pivot fitting used in FIG. 1a.

FIG. 1e is an enlarged view of a single pivot fitting used in FIG. 1a.

FIG. 2 shows the underlying frame used in the rack of FIG. 1a.

FIG. 8 is an enlarged view of an upper microphone arm used in FIG. 1a.

FIG. 9 is an enlarged view of a lower microphone arm used in FIG. 1a.

DESCRIPTION OF THE PREFERRED EMBODIMENT

Before explaining the disclosed embodiments of the present invention in detail it is to be understood that the invention is not limited in its application to the details of the particular arrangement shown since the invention is capable of other embodiments. Also, the terminology used herein is for the purpose of description and not of limitation.

First Embodiment

Figure 1A:
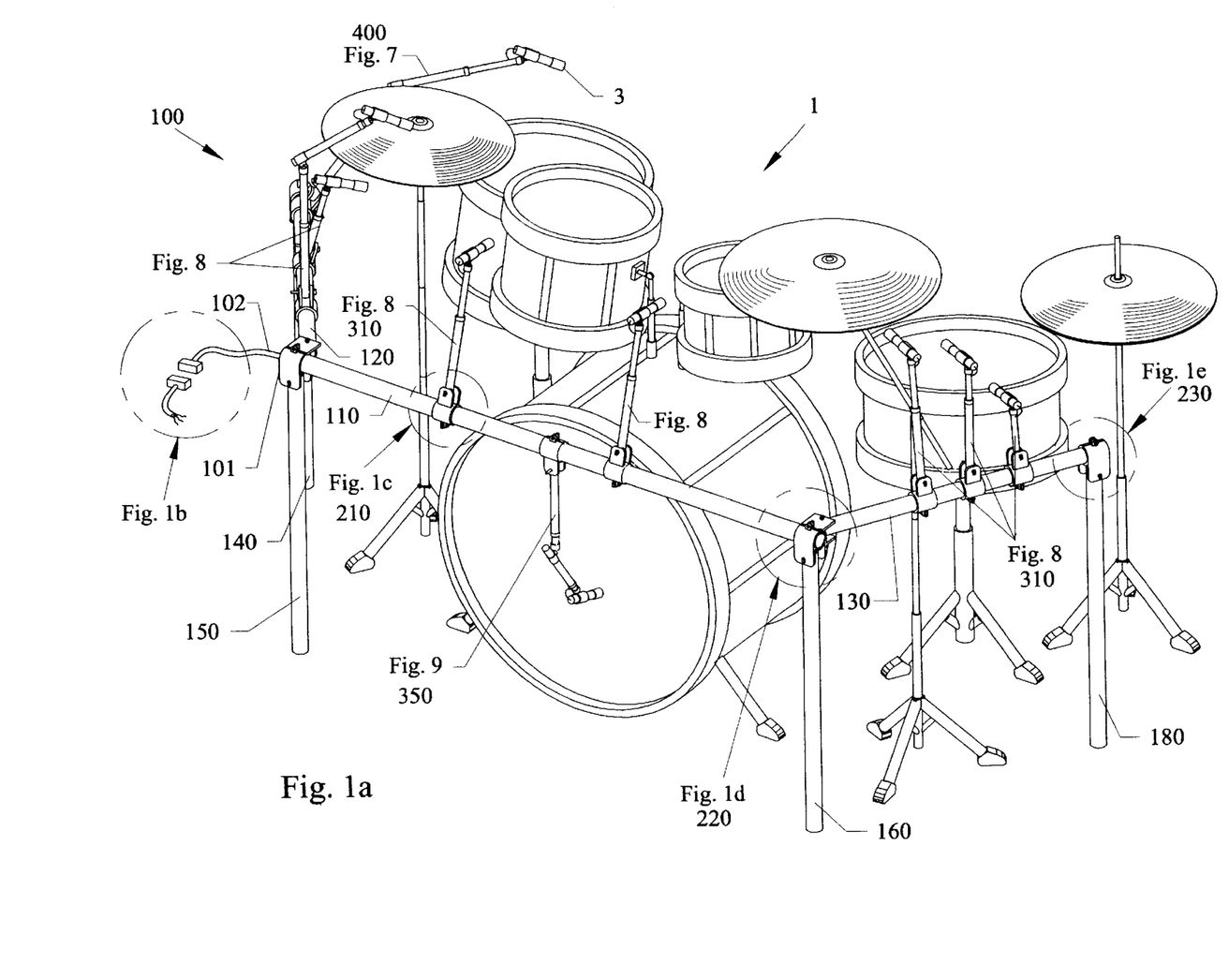
FIG. 1a is a perspective view of a first embodiment of the novel microphone support rack assembled about a drum set.

FIG. 1a is a perspective view of a first embodiment of the novel microphone support rack 100 assembled about a conventional type drum set previously described that can include a snare, hi-hats, three toms, a bass drum and overhead cymbals.

Figure 1B:
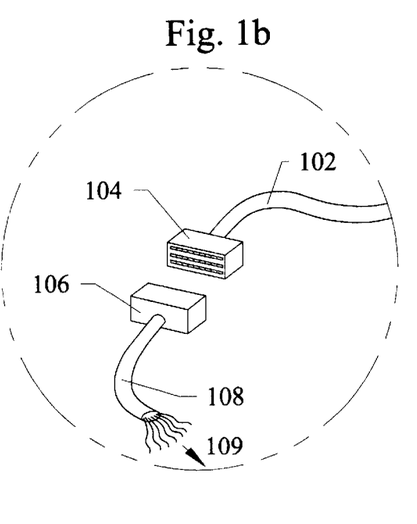

FIG. 1b is an enlarged view of the sound board connection used in FIG. 1a. The soundboard connection includes a multi-conductor cable 102 which can run through one opening end 101 in main horizontal longitudinal bar 110 to connect to the microphones attached to the support rack 100. Male and female connectors 104, 106 such as but not limited to XLR connectors, ¼ inch plugs, and the like, that can attach cable 102 to external cable 108 which can pass to conventional external equipment 109(not shown) such as amplifiers, synthesizers, and the like.

Figure 1C:
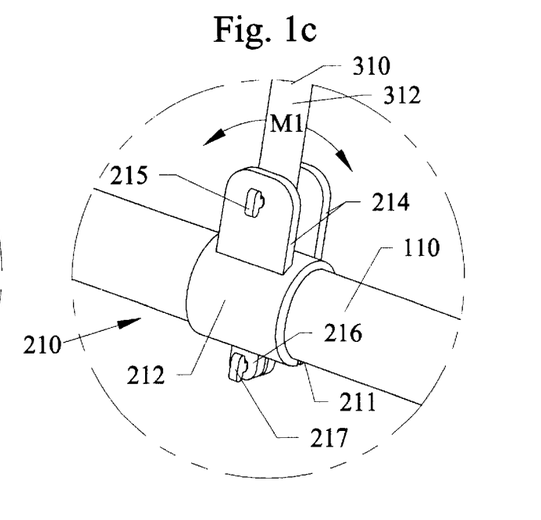
Figure 8:
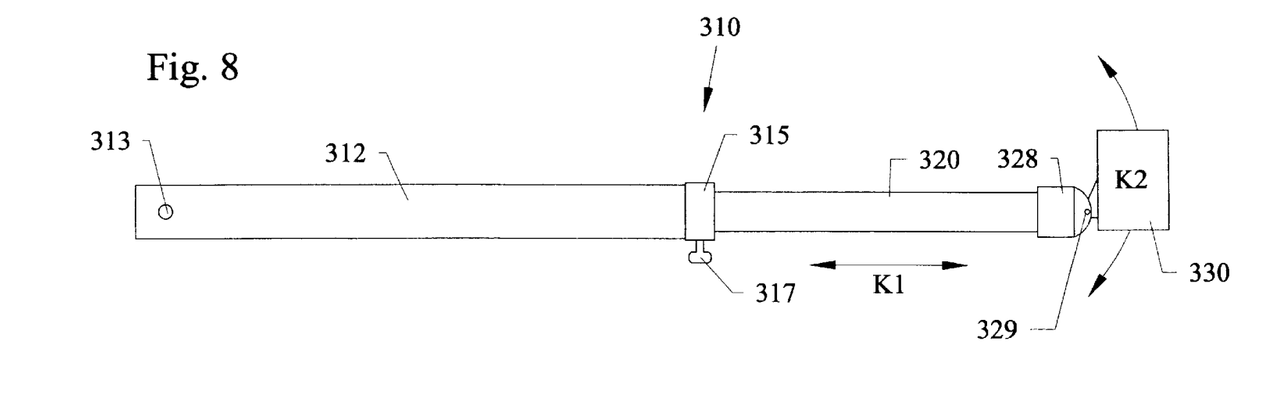

FIG. 1c is an enlarged view of a microphone mounting fitting 210 used with the novel rack 100 in FIG. 1a. Fitting 210 can include a main hollow cylinder portion 212 having open slit bottom 211 that allows the main horizontal longitudinal bar 110 to pass therethrough. A lower protruding double flange 216 can be adjusted apart from one another depending on the diameter of longitudinal bar 110 by an adjustable and tightenable thumb screw 217. On top of the main hollow cylinder 212, can be an outer telescopic tube 312 of upper microphone arm 310 pivotally attached to an upper double pivot flange 214 with an adjustable and tightenable thumb screw 215 passing therethrough(FIG. 8 shows more detail of the upper microphone arm 310 with mount hole 313 for allowing the thumb screw 215 to pass therethrough.) Screw 215 provides a pivot axis for allowing upper microphone arm 310 to be able to rotate in the both directions of arrows M1.

Figure 1D:
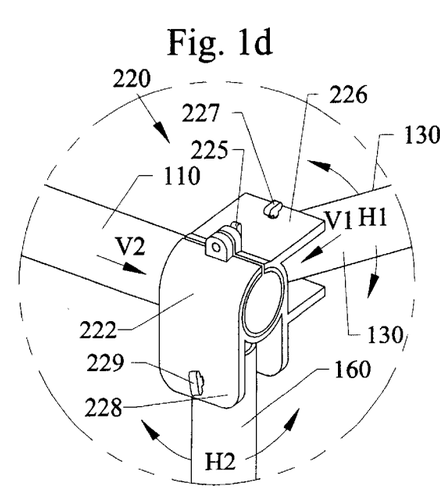
Figure 1E:
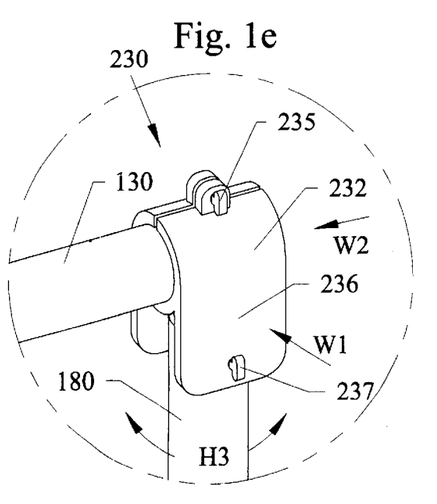

FIG. 1d is an enlarged view of a dual pivot fitting 220(and described in greater detail in reference to FIGS. 5a–5b) used in FIG. 1a. Fitting 220 can provide a connection point for allowing right horizontal longitudinal bar 130 to pivot and rotate in the direction of arrows H1 to main horizontal longitudinal bar 110. Fitting 220 also provides a connection point for allowing front right vertical leg 160 to pivot and rotate in the direction of arrows H2 to main horizontal longitudinal bar 110 FIG. 1e is an enlarged view of a single pivot fitting 230(which is described in greater detail in reference to FIGS. 6a–6b) used in FIG. 1a. Fitting 230 can provide a connection point for allowing rear right vertical leg 180 to pivot and rotate in the direction of arrows H3 to right horizontal longitudinal bar 130.

Figure 2:
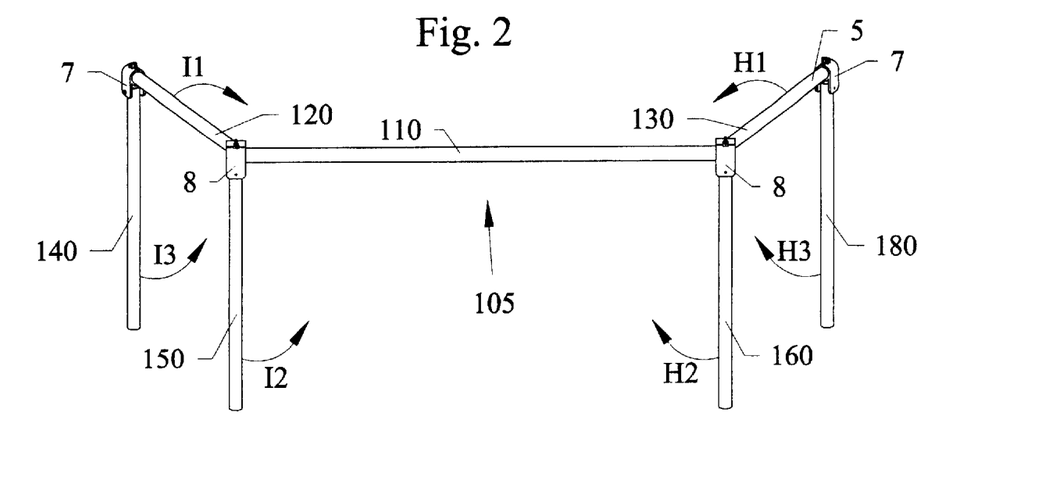

FIG. 2 shows the underlying frame 105 used in the rack of FIG. FIG. 1a. As described in the previous figures while keeping main horizontal bar 110 stationary, the right horizontal bar 130 can be rotated and folded in the direction of arrow H1, right front vertical leg 160 can be rotated and folded in the direction of arrow H2, and right rear vertical leg 180 can be rotated and folded in the direction of arrow H3. Also left horizontal bar 120 can be rotated and folded in the direction of arrow I1, left front vertical leg 150 can be rotated and folded in the direction of arrow I2, and left rear vertical leg 140 can be rotated and folded in the direction of arrow I3.

Figure 3:
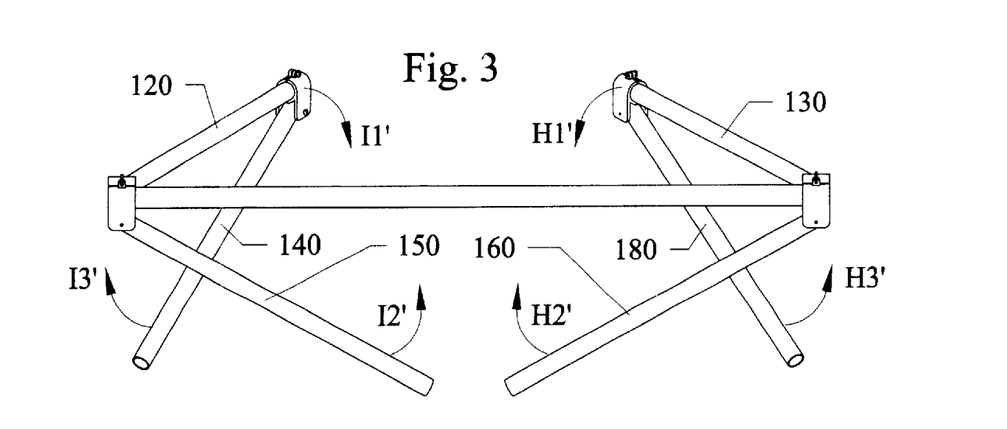
FIG. 3 shows the frame of FIG. 2 beginning to be folded.
Figure 4:
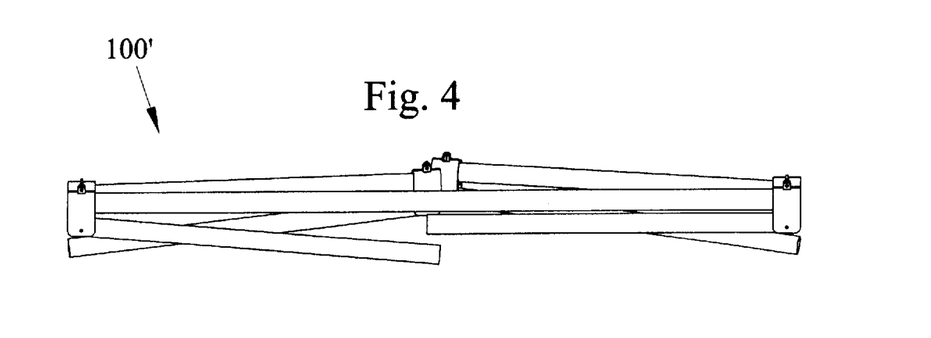
FIG. 4 shows the frame of FIG. 2 in a final folded state.

FIG. 3 shows the frame 105 of FIG. 2 beginning to be folded. FIG. 4 shows the frame 105 of FIG. 2 in a final folded state, after the components in FIG. 2 were folded again in the direction of arrows H1', H2', H3', I1', I2', and I3'. The final folded state 100' can become a bundle having dimensions of approximately four feet in length, approximately ten inches high and be approximately ten inches wide.

Figures 5A, 5B:
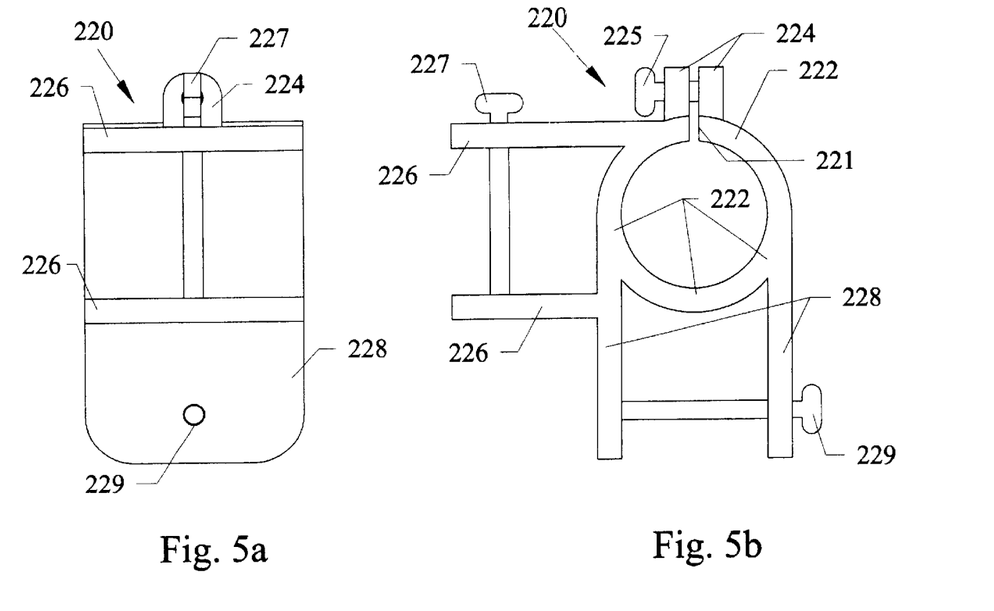
FIG. 5a is a side view of the dual pivot fitting of FIG. 1d along arrow V1.
FIG. 5b is a front view of the dual pivot fitting of FIG. 1d along arrow V2.

FIG. 5a is a side view of the dual pivot fitting 220 of FIG. 1d along arrow V1. FIG. 5b is a front view of the dual pivot fitting 220 of FIG. 1d along arrow V2. Referring to FIGS. 1d and 5a–5b, dual pivot fitting 220 includes main hollow cylindrical fitting portion 222 having open slit 221 that allows an end of the main horizontal longitudinal bar 110 to pass therethrough. An upper protruding double flange 224 can be adjusted apart from one another depending on the diameter of longitudinal bar 110 by an adjustable and tightenable thumb screw 225. On one side of the cylinder 222, can be an end of the right horizontal longitudinal bar 130 pivotally attached to double side flanges 226 with an adjustable and tightenable thumb screw 227. On the bottom of cylinder 222 can be the upper end of right front vertical leg 160 pivotally attached to double flanges 228 by an adjustable and tightenable thumb screw 229.

Figure 6A:
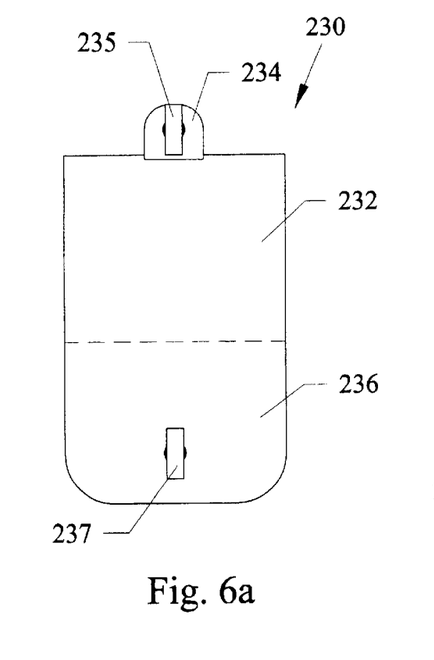
FIG. 6a is a side view of the single pivot fitting of FIG. 1e along arrow W1.
Figure 6B:
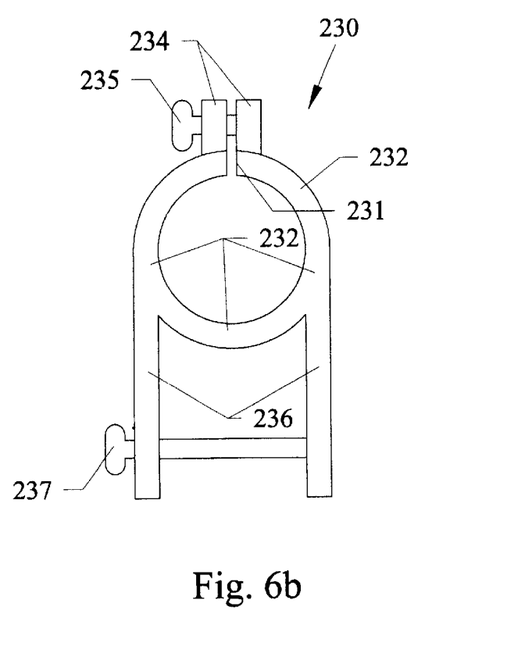
FIG. 6b is a front view of the single pivot fitting of FIG. 1e along arrow W2.

FIG. 6a is a side view of the single pivot fitting 230 of FIG. 1e along arrow W1. FIG. 6b is a front view of the single pivot fitting 230 of FIG. 1e along arrow W2. Referring to FIGS. 1e and 6a–6b, single pivot fitting 230 includes main hollow cylindrical fitting portion 232 having open slit 231 that allows an end of right horizontal longitudinal bar 130 to pass therethrough. An upper protruding double flange 234 can be adjusted apart from one another depending on the diameter of bar 130 by an adjustable and tightenable thumb screw 235. On the bottom of cylinder 232 can the upper end of right reare vertical leg 180 pivotally attached to double flanges 236 by an adjustable and tightenable thumb screw 229.

Figure 7:
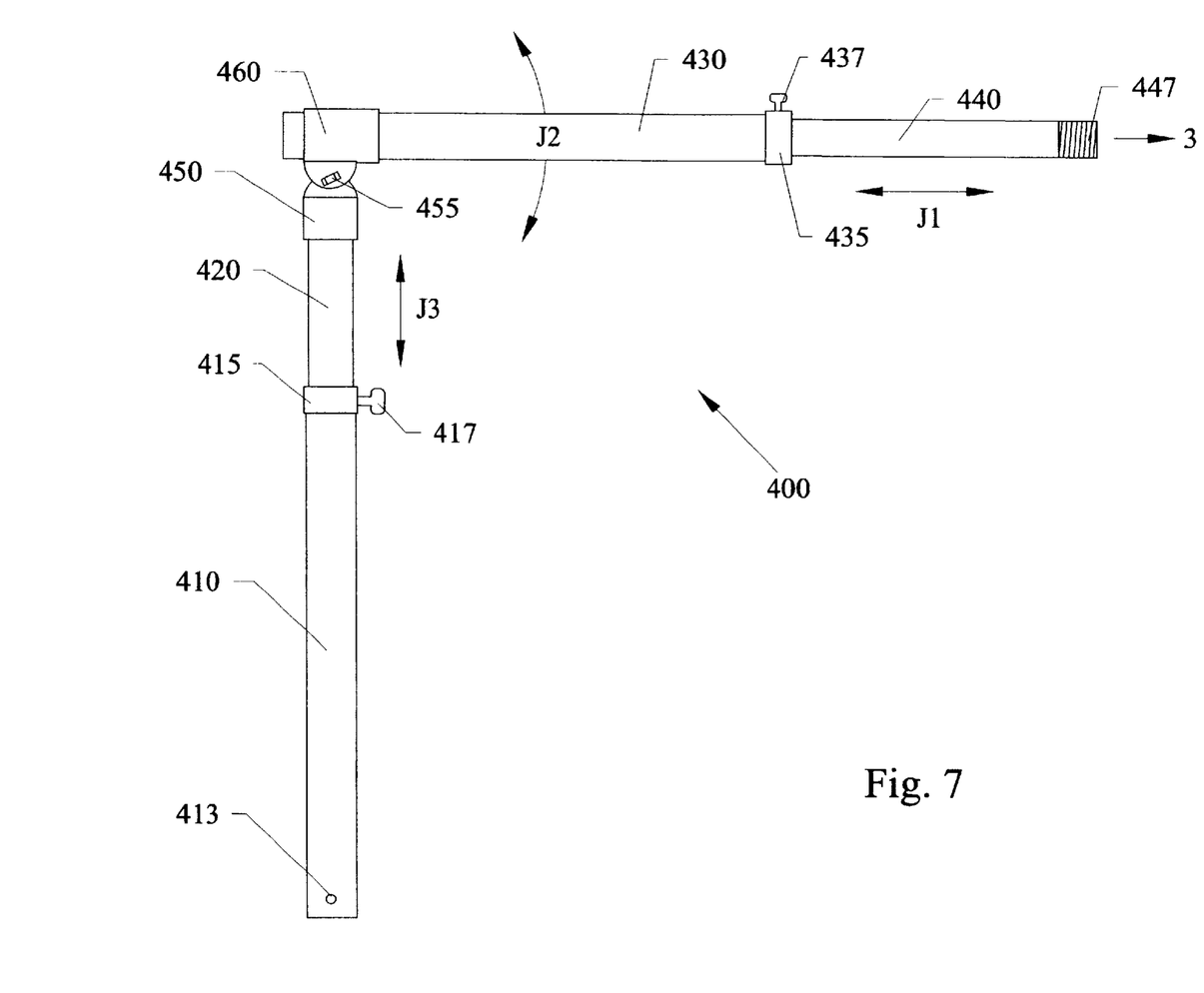
FIG. 7 is an enlarged view a double pivot and double telescoping microphone arm that can be used for vocals with the rack.

FIG. 7 is an enlarged view a double pivot and double telescoping microphone ann 400 that can be used for vocals with the rack 100 of FIG. 1a and the microphone mount fitting 210 of FIGS. 1c. Referring to FIGS. 1a, 1c and 7, the vertical outer telescopic tube 410 of arm 400 can attach to left horizontal bar 120 by thumb screw 215 passing through double flanges 214 and through-hole 413 in the lower end of outer telescopic tube 410. Vertical inner telescopic tube 420 can move up and down in the direction of arrows J3 and have an end within the upper end of outer telescopic tube 410 and be attached thereto by a clamp collar 415 and a screw 417 having a tip(not shown) which can contact an exterior lower end portion of inner telescopic tube 420. A horizontal outer telescopic tube 430 can pivot and rotate in the direction of arrows J2 relative to telescopic tubes 410 and 420 by a conventional type pivot clamps 450 and 460 attached to one another by thumb screws 455 similar to those previously described. A horizontal inner telescopic tube 440 can move in and out of outer telescopic tube 430 in the direction of arrows J1 and be held to a selected position by clamp collar 435 and thumb screw 437 similar to clamp 415 and screw 417. The outer end 447 of telescopic tube 440 can include exterior threads 447 for allowing the telescopic tube 440 to attach to a conventional microphone 3.

FIG. 8 is an enlarged view of an upper microphone arm 310 used in FIG. 1a. Referring to FIGS. 1a, 1c and 8, upper microphone arm 310 can include an outer telescopic tube 312 having a through-hole 313 in its lower end for allowing it to be pivotally attached to double flanges 214 of microphone mount fitting 210 by a thumb screw 215. An extendable and retractable inner telescopic tube 320 has a lower end which passes into outer telescopic tube 312, and is held to a selected position by a clamp collar 315 with a thumb screw 317. The thumb screw can lock the inner telescopic tube 320 to a selected position to the outer telescopic tube 312. A conventional pivot head 328 can be attached onto the outer end of inner telescopic tube 320 and be pivotally attached to a conventional microphone type clip 330 by a pivot pin 329. Clip 330 can have a hollow cavity(not shown) for allowing a base portion of a microphone to be inserted inside, and clip 330 can rotate in the direction of arrows K2 to inner telescopic tube 320 and outer telescopic tube 312.

Figure 9:
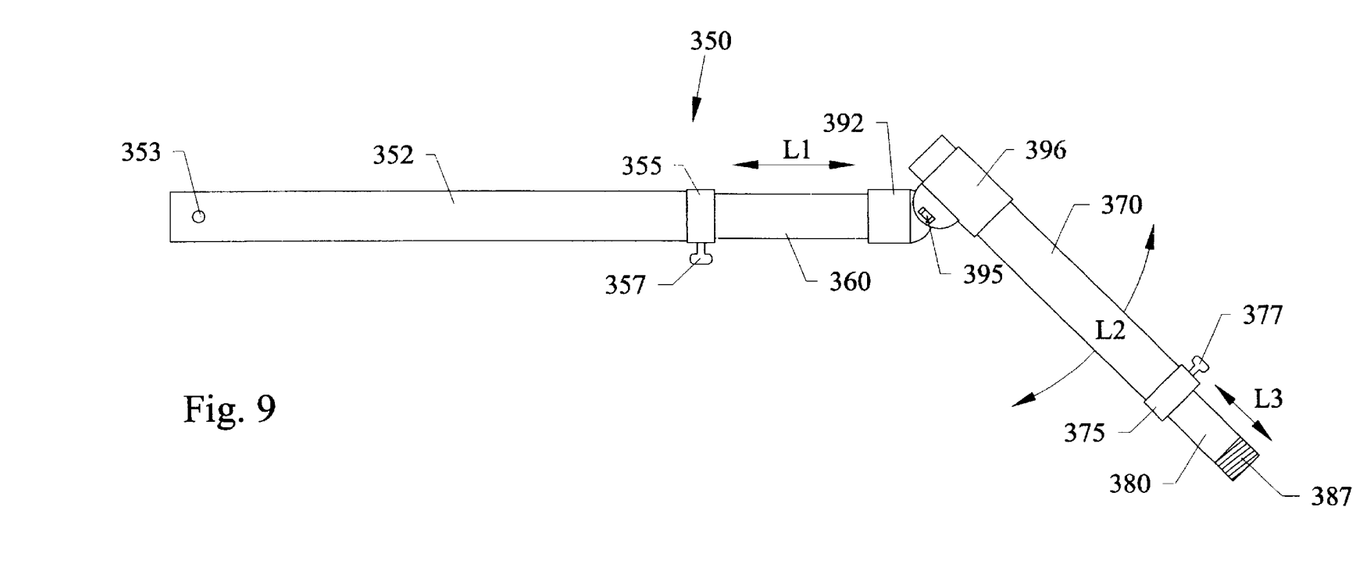

FIG. 9 is an enlarged view of a lower microphone arm 350 used in FIG. 1a, and can be similar to the double pivot and double telescoping microphone arm 400 of FIG. 7. Referring to FIGS. 1a, 1c and 9, lower microphone arm 350 can be attached to main horizontal bar 110 of rack 100 by double flanges 216 and thumb screw 217 of microphone mount fitting 210 connecting through the lower through-hole 353 which passes through a lower end portion of vertical outer telescopic tube 352. Vertical inner telescopic tube 360 can move up and down in the direction of arrows L1 and have an end within the upper end of outer telescopic tube 352 and be attached thereto by a clamp collar 355 and a screw 357 having a tip(not shown) which can contact an exterior lower end portion of inner telescopic tube 360. A horizontal outer telescopic tube 370 can pivot and rotate in the direction of arrows L2 relative to telescopic tubes 352 and 360 by a conventional type pivot clamps 392 and 396 attached to one another by thumb screw 395 similar to those previously described. A horizontal inner telescopic tube 390 can move in and out of outer telescopic tube 370 in the direction of arrows L3 and be held to a selected position by clamp collar 375 and thumb screw 377 similar to clamp 355 and screw 357. The outer end 387 of telescopic tube 380 can include exterior threads 387 for allowing the telescopic tube 380 to attach to a conventional screw-on microphone 3.

Some or all of the microphones 3 used in the first embodiment can be attached by the interior communication lines running through the rack 100 as shown in FIG. 1b, so that no external lines, cables, wires, and the like are needed.

The microphone fittings 210 of FIG. 1c can be used to attach the microphone arms 310 FIG. 8, 350 FIG. 9 and 400 FIG. 7 to any of the horizontal bars 120, 110 and 130 and to any of the vertical legs 140, 150, 160 and 180 of FIG. 1a and FIGS. 2–4 either extending upward, and/or downward and/or to any side position as needed, when arranging the microphones 3 about instruments such as a drum set 1.

Second Embodiment

Figure 10:
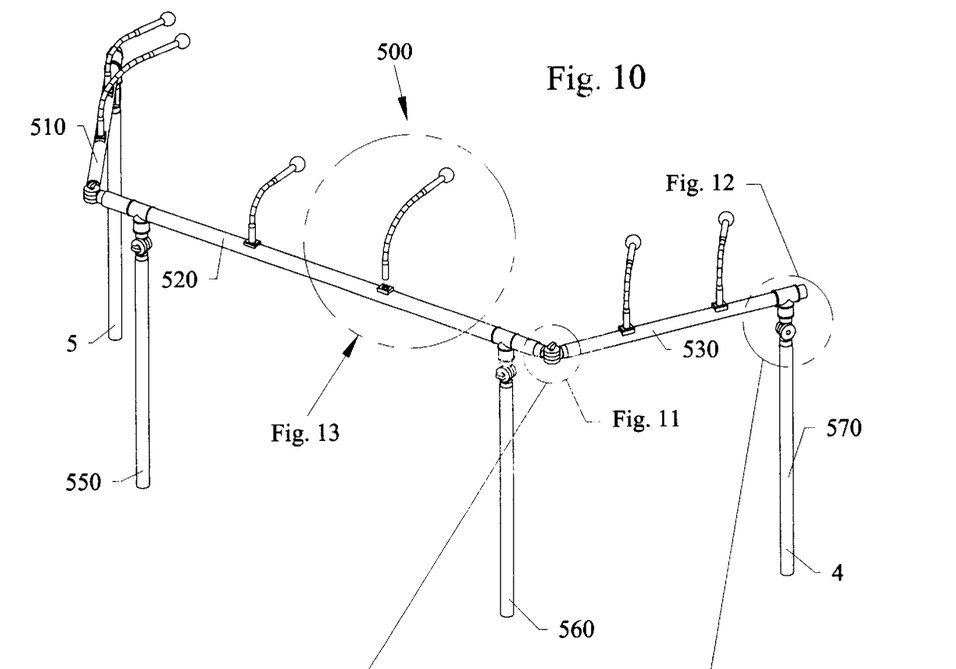
FIG. 10 is a perspective view of a second embodiment microphone support rack.
Figure 11:
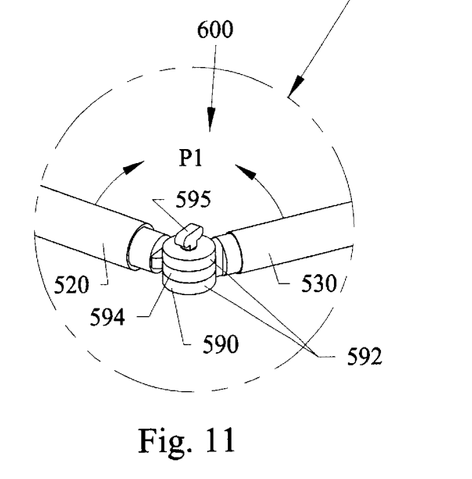
FIG. 11 is an enlarged view of a pivot support arrangement used in the rack of FIG. 10.
Figure 12:
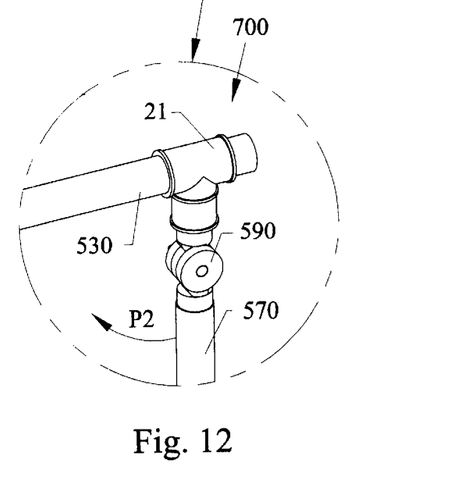
FIG. 12 is an enlarged view of a pivot fitting joint used in the rack of FIG. 10.
Figure 13:
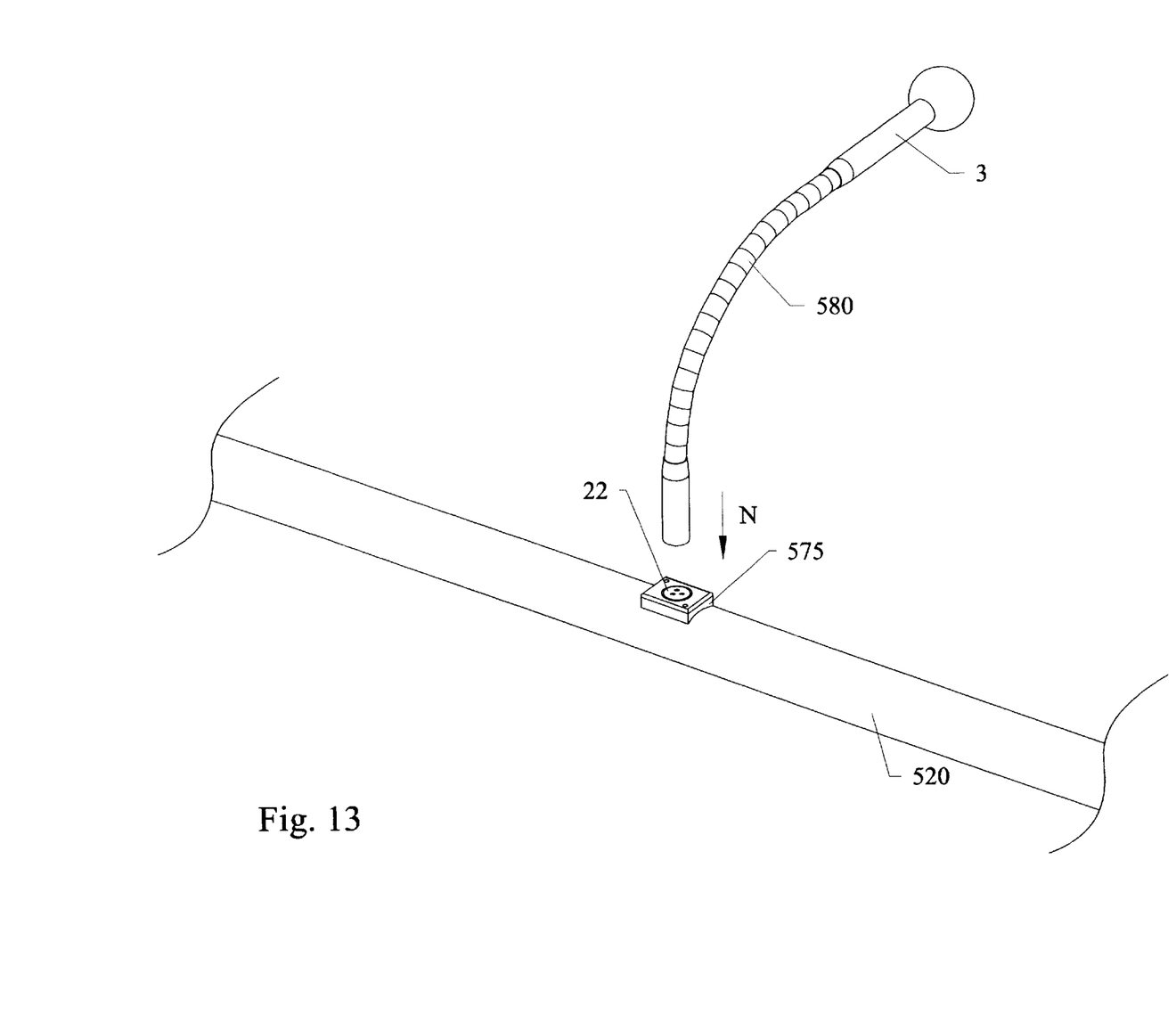
FIG. 13 is an enlarged view of a flexing microphone mount.

FIG. 10 is a perspective view of a second embodiment microphone support rack 500. FIG. 11 is an enlarged view of a pivot support arrangement 600 used in the rack 500 of FIG. 10. FIG. 12 is an enlarged view of a pivot fitting joint 700 used in the rack of FIG. 10. FIG. 13 is an enlarged view of a flexing microphone mount 800.

Referring to FIGS. 10–13, the second embodiment 500 includes three longitudinal horizontal bars 510, 520, and 530 pivotally attached to one another by a conventional type hinge arrangement. For example the hinge arrangement 600 can include a protruding portion 594 from bar 520 that passes through spaced apart flanges 592 attached to bar 530 and held together by an adjustable and tightenable thumb screw 595 which allows bars 520 and 530 to rotate and pivot to one another in the direction of arrows P1 Similarly vertical legs 540, 550, 560 and 570 can be pivotally attached to horizontal bars 510, 520, and 530 by a hinge arrangement 700 similar to hinge arrangement 600 so that the legs(570 for example) can pivot and rotate in the direction of arrows P2. A bendable goose-neck type stand 580 can connect microphone 3 to the rack 500 in the direction of arrow N by male and female connectors 575, such as but not limited to XLR type connectors, ¼ inch plugs, and the like. Interior communication lines such as those depicted in FIG. 1b can also pass into the rack 500 of the second embodiment, so that no external wires, lines, cables, and the like, are used in the second embodiment.

Similar to the first embodiment, embodiment two can also fold up when not be used, or for transport, and the like.

The components of both preferred embodiments can also be combined with one another. For example, microphone fittings 210 of FIG. 1a can be attached to the rack 500 of FIG. 10 to supplement the microphone type connections thereon, and vice versa.

Although both preferred embodiments show racks 100 and 500 using four legs and three horizontal bars, the invention can be practiced with less or more legs and bars. For example, a drummer can use double base drums, which would require four arms and four legs in the main rack. Also, the shapes of the legs and bars can also vary from being cylindrical to being rectangular, square, and the like.

While the preferred embodiment is described for supporting microphones, the invention can support other components such as the instruments themselves, combinations of the microphones and the instruments, and the like.

Although the preferred embodiments describe using the novel rack frame about a drum set, the invention can be used with and/or arranged about other types of instruments used in a band, an orchestra, and the like, such as but not limited to guitars, saxophones, violins, trumpets, and the like, and combinations, thereof.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A support rack for use with instruments, comprising in combination:

a first longitudinal horizontal member;

first leg for supporting the first longitudinal horizontal member over a floor surface;

first leg pivotable connector for allowing the first leg to fold from a vertical position extending downward beneath the first horizontal member to a horizontal position adjacent to and parallel to the first horizontal member;

second leg means for supporting the first longitudinal horizontal member over the floor surface and being spaced apart from the first leg means;

second leg pivotable connector for allowing the second leg to fold from a vertical position extending downward beneath the first horizontal member to a horizontal position adjacent to and parallel to the first horizontal member;

a first arm having a first microphone pivotally attached to an upper end of the first arm;

first arm pivotable connector attached to a lower end of the first arm and to the first horizontal member for allowing the first arm to rotate from an upward extending position to a horizontal position with the first arm adjacent to and parallel to the first horizontal member; and an instrument set adjacent to the first longitudinal horizontal member.

2. The support rack of claim 1, wherein the first arm includes:

an extendable lower member portion having a bottom end attached to the horizontal member by the first arm pivotable connector, wherein the lower member of the first arm rotates from the upwardly extending position to the first horizontal member to the horizontal position adjacent to and parallel to the first horizontal member; and an extendable upper member portion having a bottom end pivotably attached to a top end of the extendable lower member, wherein the first microphone is pivotally connected to a top end of the extendable upper member portion.

3. The support rack of claim 1, wherein the instrument set includes:

a drum set.

4. The support rack of claim 1, further comprising:

a second arm spaced apart from the first arm, having a second microphone pivotally attached to an upper end of the first arm; and second arm pivotable connector attached to a lower end of the second arm and to the first horizontal member for allowing the second arm to rotate from an upward extending position to a horizontal position with the second arm adjacent to and parallel to the first horizontal member.

5. The support rack of claim 4, further comprising:

a third arm spaced apart from the first arm and the second arm, having a third microphone pivotally attached to an upper end of the third arm;

third arm pivotable connector attached to a lower end of the third arm and to the first horizontal member for allowing the third arm to rotate from an upward extending position to a horizontal position with the third arm adjacent to and parallel to the first horizontal member.

6. The support rack of claim 1, further comprising:

a second horizontal longitudinal member attached at an angle to the first horizontal longitudinal member; and horizontal pivotable connector for allowing the first horizontal member to move from a position extending away from the first horizontal member to a second position where the second horizontal member is folded adjacent to and parallel to the first horizontal member;

third leg for supporting the second longitudinal horizontal member over a floor surface;

third leg pivotable connector for allowing the third leg to fold from a vertical position extending downward beneath the second horizontal member to a horizontal position adjacent to and parallel to the second horizontal member another arm having another microphone pivotally attached to an upper end of the another arm;

another arm pivotable connector attached to a lower end of the another arm and to the second horizontal member for allowing the another arm to rotate from an upward extending position to a horizontal position with the another arm adjacent to and parallel to the second horizontal member.

7. A support rack for supporting microphones about drums, comprising in combination:

a drum set;

a first horizontal longitudinal member adjacent to the drum set;

a second horizontal longitudinal member foldably attached to the first horizontal longitudinal member, the first and the second members wrapped about the drum set;

legs foldably attached to the first horizontal longitudinal member and to the second horizontal longitudinal member;

bendable spaced apart arms attached to the first and the second horizontal longitudinal members, the arms being movable from an upper position extending upward from the horizontal members to a folded position adjacent to and parallel to the horizontal members; and microphones pivotally attached to each of the arms, the arms extending above and below the first and the second horizontal longitudinal members.

8. The support rack of claim 7, wherein at least one bendable arm of the bendable arms includes:

an extendable lower member portion having a bottom end attached to the horizontal member a first pivotable connector, wherein the lower member of the at least one bendable arm rotates from the upwardly extending position to the horizontal member to the horizontal position adjacent to and parallel to the horizontal member; and an extendable upper member portion having a bottom end pivotably attached to a top end of the extendable lower member, wherein a microphone is pivotally connected to a top end of the extendable upper member portion.

* * * * *